(12) United States Patent
Jacquard et al.

(10) Patent No.: US 12,164,151 B2
(45) Date of Patent: Dec. 10, 2024

(54) DEVICE FOR PROCESSING LIGHT RADIATION, COMPRISING A MULTI-PLANE LIGHT CONVERSION DEVICE

(71) Applicant: CAILabs, Rennes (FR)

(72) Inventors: Clément Jacquard, Rennes (FR); Guillaume Labroille, Rennes (FR); Olivier Pinel, Rennes (FR)

(73) Assignee: CAILABS, Rennes (FR)

( * ) Notice: Subject to any disclaimer, the term of this patent is extended or adjusted under 35 U.S.C. 154(b) by 909 days.

(21) Appl. No.: 17/262,630

(22) PCT Filed: Jul. 24, 2019

(86) PCT No.: PCT/FR2019/051830
§ 371 (c)(1),
(2) Date: Jul. 7, 2021

(87) PCT Pub. No.: WO2020/021196
PCT Pub. Date: Jan. 30, 2020

(65) Prior Publication Data
US 2022/0252891 A1    Aug. 11, 2022

(30) Foreign Application Priority Data

Jul. 25, 2018  (FR) ........................................ 1856890
Feb. 26, 2019  (FR) ........................................ 1901955

(51) Int. Cl.
*G02B 6/14*        (2006.01)
*G02B 26/06*     (2006.01)
*G02B 27/09*     (2006.01)

(52) U.S. Cl.
CPC ............... *G02B 6/14* (2013.01); *G02B 26/06* (2013.01); *G02B 27/0938* (2013.01);
(Continued)

(58) Field of Classification Search
None
See application file for complete search history.

(56) References Cited

U.S. PATENT DOCUMENTS

| | | | |
|---|---|---|---|
| 5,029,243 A * | 7/1991 | Dammann | B23K 1/0056 219/121.75 |
| 6,377,726 B1 | 4/2002 | Danziger et al. | |

(Continued)

FOREIGN PATENT DOCUMENTS

| | | |
|---|---|---|
| CN | 106200207 A | 12/2016 |
| EP | 2469221 A1 | 6/2012 |

(Continued)

OTHER PUBLICATIONS

International Search Report for International Application No. PCT/FR2019/051830 dated Nov. 21, 2019, 7 pages.
International Written Opinion for International Application No. PCT/FR2019/051830 dated Nov. 21, 2019, 8 pages.
(Continued)

*Primary Examiner* — Derek S. Chapel
(74) *Attorney, Agent, or Firm* — TraskBritt

(57) ABSTRACT

A device for processing light radiation, comprises: an optical input for receiving an input beam from an optical source and for propagating in the device an input radiation, an optical output for emitting an output beam having predetermined spatial parameters, an MPLC device, which is arranged between the optical input and the optical output, and which is configured to spatially separate, in a separation plane, the input radiation into useful radiation, in a target mode, which is propagated to the optical output and into an interference radiation. The processing device also comprises at least one blocking device for blocking the interference radiation, which blocking device is arranged in the separation plane so that it does not contribute to the output beam.

20 Claims, 2 Drawing Sheets

(52) U.S. Cl.
CPC ..... *G02B 27/0944* (2013.01); *G02B 27/0977* (2013.01); *G02B 27/0927* (2013.01)

(56) References Cited

U.S. PATENT DOCUMENTS

| | | | |
|---|---|---|---|
| 9,250,454 | B2 | 2/2016 | Morizur et al. |
| 2015/0349910 | A1 | 12/2015 | Huang et al. |
| 2017/0010463 | A1 | 1/2017 | Morizur et al. |
| 2019/0097723 | A1* | 3/2019 | Morizur ............ H04B 10/2525 |

FOREIGN PATENT DOCUMENTS

| | | |
|---|---|---|
| EP | 3061964 A1 | 8/2016 |
| FR | 3061964 A1 | 7/2018 |
| FR | 3078412 | 8/2019 |
| JP | 02-117791 A | 5/1990 |
| JP | 2015-207001 A | 11/2015 |
| WO | 2018/104725 A1 | 6/2018 |

OTHER PUBLICATIONS

Labroille et al., Efficient and Mode Selective Spatial Mode Multiplexer Based on Multi-Plane Light Conversion, Optics Express, vol. 22, No. 13, Jun. 30, 2014, pp. 15599.

Morizur et al., Programmable Unitary Spatial Mode Manipulation, J. Opt. Soc. Am. A, vol. 27, No. 11, (Nov. 2010), pp. 2524-2531.

Japanese Office Action for Application No. 2021-528002 dated Mar. 7, 2023, 6 pages.

Liu et al., Dynamic Laser Beam Shaping for Material Processing Using Hybrid Holograms, Optics & Laser Technology, vol. 102, (Jun. 2018), pp. 68-73.

Chinese First Office Action for Chinese Application No. 201980057880.7, dated Aug. 23, 2022, 14 pages with translation.

Bade et al., Fabrication and Characterization of a Mode-Selective 45-Mode Spatial Multiplexer Based on Multi-Plane Light Conversion, Optical Fiber Communication Conference Postdeadline Papers, OSA Technical Digest, Optical Society of America, (2018), paper Th4B.3, pp. 1-3.

Delaubert, V., Quantum measurements of spatial conjugate variables: displacement and tilt of a Gaussian beam, Optics Letters, vol. 31, Issue 10, pp. 1537-1539, (2006) (https://www.osapublishing.org/ol/abstract.cfm?uri=ol-31-10-1537.

* cited by examiner $E(x,y) = k0\, E_{00}(x,y) + k_1\, E_{01}(x,y) \ldots + k_8\, E_{33}(x,y)$

DEVICE FOR PROCESSING LIGHT RADIATION, COMPRISING A MULTI-PLANE LIGHT CONVERSION DEVICE

CROSS-REFERENCE TO RELATED APPLICATIONS

This application is a national phase entry under 35 U.S.C. § 371 of International Patent Application PCT/FR2019/051830, filed Jul. 24, 2019, designating the United States of America and published as International Patent Publication WO 2020/021196 A1 on Jan. 30, 2020, which claims the benefit of the filing date under Article 8 of the Patent Cooperation Treaty of French Patent Application Serial No. 1856890, filed Jul. 25, 2018, and of French Patent Application Serial No. 1901955, filed Feb. 26, 2019.

TECHNICAL FIELD

The present disclosure relates to an optical device for processing light radiation, for example, for modal filtering and/or for shaping this light beam, comprising a device for converting multi-plane light.

BACKGROUND

There are many applications where the free-space beam shaping can be relevant. These applications include:
- Machining, drilling, precision cutting and surface treatment of materials by laser,
- Imaging, and, in particular, microscopy,
- LIDAR detection,
- Free-space optical communications.

Any device for spatial shaping of a light beam can be sensitive to the spatial parameters of this beam. Indeed, the quality of spatial shaping of a light beam may be impaired if the spatial parameters of the beam are not those that were foreseen during the design of the shaping device.

When the spatial parameters of a light beam are critical, it is common to carry out amplitude filtering on the incident beam using one or more diaphragms and potentially an imaging optical system. This method converts a variation in the position and/or direction and/or size of the incident light beam into a loss of optical power and a deformation of this beam. Although this method has the advantage of being simple to implement, it only makes it possible to partially limit the effects of a variation in position and/or direction and/or size of the incident light beam with respect to the parameters of the beam as they were assumed when the device was designed. In addition, the very nature of amplitude filtering involves an initial cost in optical power.

There are optical devices for converting multi-plane light known from U.S. Pat. No. 9,250,454 and US2017010463, designated by the acronym MPLC (Multi-Plane Light Conversion), making it possible to carry out any unitary spatial transformation of light radiation.

From a theoretical point of view, and as was established in "Programmable unitary spatial mode manipulation," Morizur et Al, J. Opt. Soc. Am. A/Vol. 27, No. 11/November 2010, a unitary spatial transformation can effectively be broken down into a succession of primary transformations, each primary transformation affecting the transverse phase profile of the light radiation. In practice, and without this forming any limitation of this technology, MPLC components typically apply between three and twenty-five primary transformations.

The present disclosure presents a device for processing light radiation, for example, allowing modal filtering and/or shaping of light radiation. This device, implementing an MPLC device, differs from known methods based on diaphragms in that it makes it possible to process the input beam more completely while limiting the losses of optical power.

BRIEF SUMMARY

The object of the present disclosure is to provide a device for processing light radiation, comprising:
- an optical input for receiving an input beam from an optical source and for propagating an input radiation in the device;
- an optical output for emitting an output beam having predetermined spatial parameters;
- an MPLC conversion device that is arranged between the optical input and the optical output, and which is configured to spatially separate, in a separation plane, the input radiation into useful radiation, in a target mode, which is propagated to the optical output and into an interference radiation;
- at least one device for blocking the interference radiation, arranged in the separation plane so that it does not contribute to the output beam.

According to other advantageous and non-limiting features of the present disclosure, taken alone or in any technically feasible combination:
- the processing device comprises a transmission device for shaping the useful radiation and shaping the output beam;
- the processing device comprises a plurality of blocking devices arranged, respectively, in a plurality of separation planes in which a part of the interference radiation is spatially isolated;
- the blocking device comprises an absorbing, diffusing or reflecting optical element;
- the blocking device is integrated at least in part into the MPLC conversion device;
- the blocking device comprises a detection element for collecting at least part of the interference radiation;
- the transmission device comprises, arranged downstream of the conversion device, a diffractive optical element, a spatial phase modulator, an optical system comprising at least one lens, an axicon, a beam splitter and/or a second MPLC conversion device;
- the transmission device is integrated at least in part into the MPLC conversion device;
- the transmission device comprises at least one non-spherical and non-plane optical element, and preferably between one and three non-spherical and non-planar optical elements;
- the non-spherical and non-planar optical element is a reflective optical element;
- the processing device also comprises a control device between the optical input and the MPLC conversion device;
- the control device is an inactive optical element;
- the MPLC conversion device is configured to transform an input mode base into an output mode base, the input and output mode bases having separable spatial variables.

BRIEF DESCRIPTION OF THE DRAWINGS

Other advantages and particularities of the present disclosure will become apparent on reading the detailed description of implementations and embodiments, which are in no way limiting, with regard to the accompanying drawings in which.

DETAILED DESCRIPTION

Figure 1:
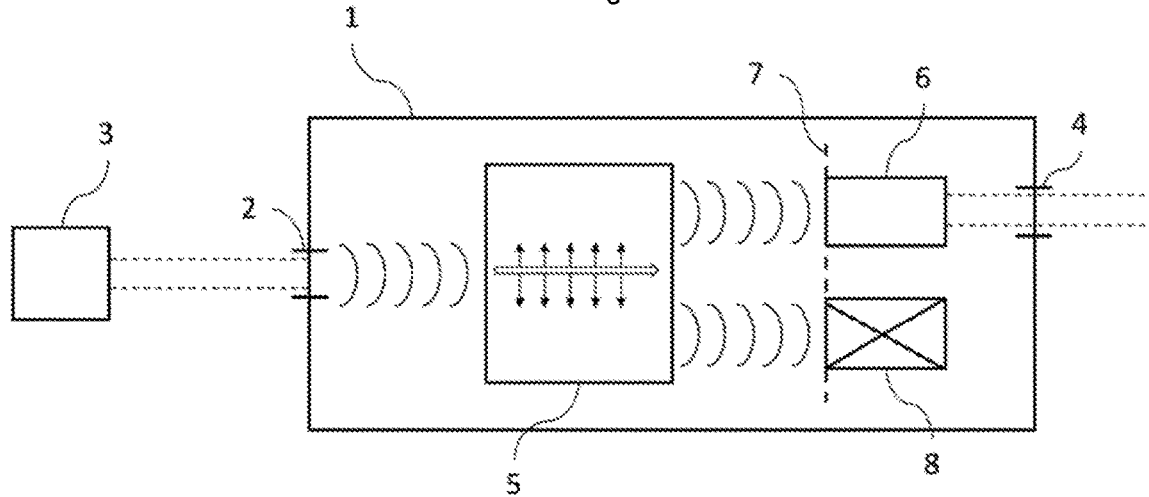
FIG. 1 shows a first embodiment of a processing device according to the present disclosure.

In the present disclosure, "mode" denotes a vector transverse mode of the electromagnetic field, that is to say, the data of the space-frequency distributions of amplitude, of phase associated with the two transverse spatial components of the mode.

A mode base is a set of orthonormal modes of the electromagnetic field. Consequently, the modification or the transformation of a mode base denotes the modification or space-frequency transformation of at least one of the modes of the mode base.

The overlap between two modes is defined as the squared modulus of the integral in a transverse plane of the scalar product between the two modes.

A light beam denotes an electromagnetic field consisting of one mode or of a superposition of several modes.

The term "spatial parameters of the light beam" denotes the scalar parameters defining the amplitude and phase distributions associated with the electromagnetic field.

As an example of spatial parameters of a light beam, the following parameters can be cited:
  the direction of propagation of the light beam, defined by means of the average linear phase of the associated electromagnetic field;
  the position of the light beam, defined as the position of the center of gravity of the beam intensity distribution in a plane perpendicular to the direction of propagation of the beam;
  the horizontal or vertical size of the light beam, defined as the standard deviation of the horizontal or vertical marginal intensity distribution (as defined by the international ISO standard); the ellipticity of the beam;
  the divergence of the beam, which may possibly be anisotropic.

In the present disclosure, it will be considered that the light beams are polarized in a single direction. However, the principles set out are entirely applicable to a light beam having more than one direction of polarization. Thus, the spatial phase shift applied to a light beam by a phase mask in the context of the disclosure can be expressed more generally as a space-frequency phase shift, i.e., modifying the phase shift according to the space variables in a transverse plane and according to the optical frequency.

For the sake of completeness, the operating principles are recalled of a Multi-Plane Light Conversion (MPLC) device. In such a device, an incident light beam undergoes a succession of reflections and/or transmissions, each reflection and/or transmission being followed by free-space propagation of the beam. At least some of the optical parts on which the reflections and/or the transmissions take place, generally in distinct successive locations, and which guide the propagation of the incident beam, have a microstructured surface that modifies the phase of the incident light beam in order to give it a predetermined optical function. Thus, generally, at least four reflections and/or transmissions are provided, such as 8, 10, 12, 14, or even at least 20 reflections and/or transmissions, for example. Advantageously, the shape of the incident light radiation and of the modified light radiation are different from each other.

The term "microstructured surface" means that the surface of the optical part can have a relief, for example, in the form of "pixels" whose dimensions are between a few microns to a few hundred microns. Each pixel has a variable elevation with respect to a mean plane defining the surface in question, of at most a few microns or at least a few thousandths of microns. An optical part having such a microstructured surface forms a phase mask introducing local phase shifts within the cross-section of the light beam, which is reflected thereon or is transmitted therein.

FIG. 1 shows an embodiment of a processing device 1 according to the present disclosure.

Such a device 1 has an optical input 2 for receiving an input light beam from an optical source 3 and for propagating an input radiation in the device 1, and an optical output 4 for emitting an output light beam. In the illustration of FIG. 1, the optical input 2 and output 4 consist of a single passage allowing free-space propagation of the beams, but provision could be made for one and/or the other of this input 2 and this output 4 to be formed by a connector or an optical stage, for example, making it possible to couple the device 1 to at least one input and/or one output optical fiber.

The processing device 1 comprises an MPLC (Multi-Plane Light Conversion) device 5, which makes it possible to ensure modal filtering of the input beam, that is to say, to separate and/or extract unwanted modal components from the input beam. The output beam therefore corresponds, at a minimum, to the input beam filtered for undesired modal components. The output beam has parameters chosen in advance (predetermined) and these are likely to be different from the parameters of the input beam. The MPLC device 5 may optionally be supplemented by any element 6 for shaping the beam, also referred to as the transmission device 6, once the filtering has been carried out.

Generally speaking, an MPLC makes it possible to transform an input mode base into an output mode base. To design an MPLC, it is therefore necessary to define these two bases. To implement modal filtering, the input base is determined from an assumed (or nominal) input light beam. The MPLC output mode base is determined by the desired light beam at the output of the device and by the nature of the means for extracting the optical power from the unwanted modal components. The desired (or "useful") light radiation mode at the output of the MPLC device 5 will be designated as the target mode.

By way of example, the following procedure can be followed in order to determine the input mode base of the MPLC, when the assumed input beam is single-mode:
  define an assumed input mode, the closest possible mode to the input beam mode that will actually be used,
  construct a family of modes from the assumed input mode, at least one of the spatial parameters of which is varied,
  construct a mode base from the mode family using a singular value decomposition,
  determine a first mode of the base, such as the mode of the base having maximum overlap with the assumed input mode, complete the first mode with the modes obtained during the decomposition into singular values, then apply an orthonormalization process of these modes to form the input base.

While the input beam is produced by a multimode optical source 3, for example, through a multimode fiber, the input base of the MPLC device 5 can be constructed from the modes of the source rather than by the method described above. The assumed input mode is then the modal component of the assumed input beam comprising the most optical power.

In all cases, the input mode base is made up of modes that are not entirely spatially disjointed.

It is known from the document "Quantum measurements of spatial conjugate variables: displacement and tilt of a Gaussian beam," V. Delaubert, Optics Letters, Vol. 31, Issue 10, pp. 1537-1539, (2006) (https://www.osapublishing.org/ol/abstract.cfm?uri=ol-31-10-1537), that within the limit of small variations of a physical parameter of interest (for example, but not exclusively, the direction and/or the position of a light beam), part of the energy of the light beam is transferred to the higher order mode(s). Thus, in the case of a supposed Gaussian input mode, it could be decided to use a Hermite-Gaussian input base whose first mode is the assumed Gaussian input mode.

To determine the output mode base of the MPLC device 5, a base is chosen for which there is a plane, called a separation plane in the present disclosure, in which the output modes other than the target mode are sufficiently spatially disjointed from the target mode so that these output modes can be blocked, for example, by an absorbing or diffusing optical element, or deflected by a reflecting optical element, it being understood that the target mode undergoes an arbitrarily low energy loss. For example, Gaussian output modes could be used, sufficiently spatially separated so that their overlap is zero, two by two and distributed linearly in the separation plane, in a triangle or a rectangle.

The MPLC device 5 of a processing device 1 according to the present disclosure is configured to transform the input mode base into the output mode base, in particular, ensuring that the assumed input mode is transformed into the target mode.

The optical blocking, diffusing or reflecting element (or more generally the blocking device 8) can be integrated into the processing device 1 of the present disclosure. It can, in particular, be integrated into the MPLC device 5, or physically separate from the latter, as is the case in the schematic illustration of FIG. 1. The MPLC device 5 can, in particular, be combined with a detection element making it possible to collect the output modes of the MPLC device 5 associated with the interference modes of the incident light beam with a view to their total or partial detection.

In the case of a particular input beam, corresponding to an assumed input beam whereof at least one of the spatial parameters has been modified, the MPLC device 5 performs a projection, in the mathematical sense of the term, of this particular beam based on its input modes. The optical power in each input mode of the MPLC device 5 is transferred to the associated output mode. In the absence of a variation in at least one of the spatial parameters, all of the optical power of the particular input light beam (which then corresponds to the assumed input beam) is transferred by the MPLC to the target mode. In the event of variation in spatial parameters, the optical power portion of the particular input light beam in the assumed input mode, referred to as the useful power, is transferred by the MPLC device 5 from the assumed input mode to the target mode in the form of useful radiation. The optical power portion of the particular input light beam in the other modes of the base, referred to as the non-useful power, is transferred by the MPLC device 5 to the output modes, which are orthogonal to the target mode in the form of interference radiation. In other words, the MPLC is configured to spatially separate, in a separation plane 7, the input radiation into useful radiation, in a target mode, which propagates toward the optical output 4, and into interference radiation.

The optical power portion in the output modes of the MPLC device 5, which are orthogonal to the target mode, that is to say, the interference radiation, can then be blocked by the blocking device 8, formed, for example, by an absorbing or diffusing optical element or by any optical collection element for total or partial detection.

The MPLC device 5 thus constitutes a passive modal filter where, within the limit of small variations of the spatial parameters, the optical power of the light beam that is outside the assumed input mode is completely extracted. The processing device 1 thus provides a blocking device 8 for blocking the interference radiation, arranged in the separation plane, so that this radiation does not propagate toward the optical output 4 of the device and so that it does not contribute to the output beam. As has been seen, this blocking device 8 can comprise an optical blocking, diffusing and/or reflecting element.

In one particular embodiment, the optical power in the target mode at the output of the MPLC device 5, that is to say, the useful radiation, can be directed, within the processing device 1 toward another optical element 6, referred to as transmission device 6 in the present disclosure, producing light beam shaping. This optical element 6 can, for example, but not exclusively, be:
  another MPLC device,
  a Diffractive Optical Element (DOE),
  a spatial phase modulator (or SLM for Spatial Light Modulator),
  an imaging optical system or system comprising at least one lens,
  an axicon,
  at least one optical, transmissive or reflective, non-spherical and non-planar element, such as an aspherical or free-form optical element (from the expression "free-form optics").

In one particularly advantageous embodiment, the shaping of the beam produced by the transmission device 6 can be implemented at least in part by another MPLC. In this case, it is possible to design an MPLC successively or simultaneously implementing the function of modal filtering of a light beam and the function of shaping this same light beam, or part of this shaping.

The target mode (constituting the useful radiation) and the other modes (constituting the interference radiation) may not all be separable in a single separation plane. In this situation, it is possible to provide a plurality of separation planes, distant from each other by a propagation space, in which it is possible to successively isolate some of the other modes contributing to the interference radiation. In this case, a plurality of blocking devices 8 will be provided, which will be placed, respectively, in the separation planes, in order to block the part of the spatially isolated interference radiation in each plane.

The interest of the present disclosure is demonstrated in the following paragraphs by detailing a concrete implementation of the modal filtering of a light beam and, optionally, of its spatial shaping.

Example 1

It is desired to stabilize an input light beam whose transverse spatial profile is Gaussian with a diameter of 1 mm, and which is liable to experience a variation in its direction of propagation. The mode of this light beam, without variation of the direction of propagation, defines the assumed input mode of the MPLC device 5.

It is decided here to use a base of Hermite-Gauss with only three modes as input base. There are two higher order modes associated with the change in direction of the input beam, one for each orthogonal direction of the plane transverse to the beam propagation.

The output modes of the MPLC device 5 are determined by the desired light beam at the output 4 of the processing device 1. For reasons of simplicity, but without restricting the generality of the device, an output light beam is chosen here consisting of a target mode identical to the input mode, i.e., a light beam whose transverse spatial profile is Gaussian with a diameter of 1 mm. In other words, the processing device 1 of this example does not comprise a transmission device 6 for shaping the output beam.

For the two output modes that are complementary to the target mode, that is to say, the modes of the MPLC output base associated with the higher order modes of the input base, two modes are chosen that are identical to the target mode but spatially separated by 1.5 mm (i.e., 150% of the diameter of the target mode), the three output modes being arranged at the corners of an isosceles triangle. This arbitrary, but common value ensures that the overlap between the MPLC output modes is less than 0.02% of their energy.

Once the input and output bases of the MPLC device 5 have been determined, the phase masks of the MPLC can be generated digitally by means of the method described, for example, in U.S. Pat. No. 9,250,454. Here, it is chosen to use five phase masks. The phase plate implementing these phase masks can be manufactured, for example, from photolithography techniques. Once the phase plate has been manufactured, it is assembled with the other optical components of an MPLC, for example, with a mirror that faces it to form a multi-passage cavity, in which the incident radiation propagates to effect the chosen transformation. The distance chosen between the phase plate and the mirror may here be on the order of 20 cm.

In the separation plane where the output modes of the MPLC device 5 are spatially separated, a blocking device 8 formed by a diaphragm with a diameter of 1.5 mm (i.e., 150% of the diameter of the target mode) is placed centered on the target mode. The value chosen for the diaphragm diameter ensures that approximately more than 98.9% of the energy of the target mode is transmitted while less than approximately 0.1% of the energy of the other output modes of the MPLC is transmitted.

In order to evaluate the performance of the processing device 1, a variation in the direction of the input light beam of the device is introduced into a digital simulation of this device and two physical quantities of interest are evaluated after the diaphragm:

The overlap between the output light beam mode and the target mode,
The optical power in the output light beam.

Figure 2:
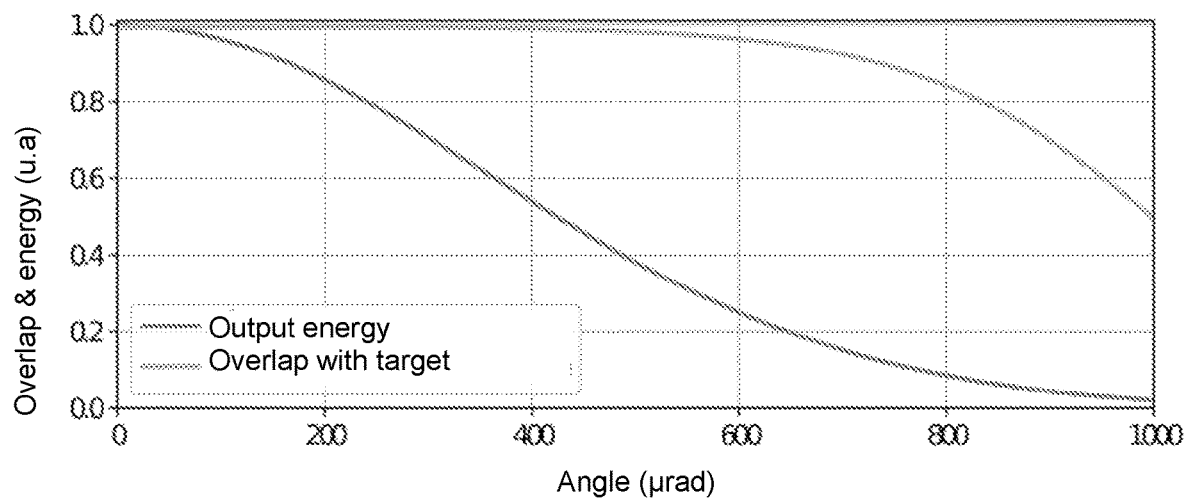
FIG. 2 is a graph showing the variation of the overlap between the mode of the output beam and the target mode and of the optical power in the output beam as a function of the direction of the input beam.

The results are shown in FIG. 2. The following observations are made:

the overlap between the output light beam mode and the target mode remains constant over an angular range of the particular input beam, which is not zero,
The optical power in the output light beam drops as the angular deviation increases.

These two observations demonstrate that the device according to the present disclosure makes it possible to maintain a constant overlap between the mode of the output light beam and the target mode over a wide variation range of a parameter of the input light beam, at the expense of a loss of optical power on the output beam. This loss of optical power corresponds exactly to the optical power, which has left the mode to be stabilized in order to populate the interference modes and constitutes a fundamental limit that cannot be overcome without an active device.

The ability of a device according to the present disclosure to passively maintain the constancy of the mode of the output light beam constitutes an important innovation in the field of modal light beam filtering.

In the example that has just been presented, a Gaussian target mode was chosen, but it is quite possible to envisage a target mode whose intensity corresponds, after free-space or non-free-space propagation, for example, to:

a square or rectangular "Flat Top" beam;
a circular "Flat Top" beam;
a Bessel beam;
a line-shaped top beam (produced by a flat top in a first direction and a Gaussian in a direction perpendicular to the first);
a ring-shaped beam.

To facilitate the shaping of the useful radiation coming from the MPLC device 5 and to form a beam according to one of the shapes given as an example above, the MPLC device 5 can be completed with a transmission device 6 comprising at least one non-spherical and non-planar optical element, and preferably between one and three of these elements. The term "non-spherical and non-planar optical element" denotes an optical, transmissive or reflective element, the surfaces of which are neither spherical nor flat. It can, for example, be an aspherical optical element (which generally has a symmetry of revolution about an axis perpendicular to its mean plane) or a free-form optical element (which does not exhibit symmetry of revolution or of translation about an axis perpendicular to its mean plane).

Very generally, a small number of such non-spherical and non-planar optical elements, from one to three, makes it possible to shape the useful radiation into a wide variety of beam shapes, in particular, those given as an example above, and which are of particular interest in applications for machining, drilling, precision cutting and surface treatment of materials by laser.

By combining the MPLC device 5 with a transmission device 6 configured with such optical elements, the design of the MPLC device 5, and, in particular, the number of phase masks, is simplified by producing the "shaping" part of the useful radiation by a more conventional optical system.

Advantageously, these optical elements will be reflective because they have a lower chromatic dispersion and a higher power handling than a transmissive optical element, which is particularly important in applications using power or pulsed lasers whose duration is around ten femtoseconds.

A first use case of a device according to the present disclosure is the stabilization of a beam whereof at least one of the spatial parameters is not constant over time. The device according to the present disclosure then makes it possible to produce a beam whose spatial parameters are stable over time and whose optical power fluctuates with variations in these parameters.

A second use case of a device according to the present disclosure is that where there is no input beam, the spatial parameters of which are strictly those of the assumed input beam, that is to say, which was used during the design of the device. This makes it possible to produce a beam whose spatial parameters are fixed during the design and do not depend on absolute knowledge of the input beam. In other words, the device makes it possible to be robust with respect to a statistical variability of the input beam, which may vary from one implementation to another or from one optical source 3 to another.

Figure 3:
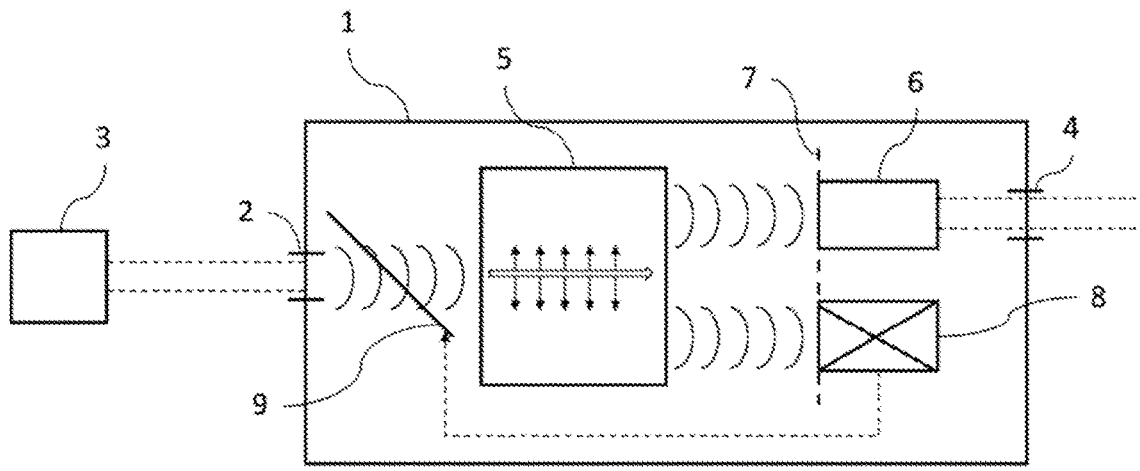
FIG. 3 shows a second embodiment of a processing device according to the present disclosure.

The device makes it possible to separate the useful power from the non-useful power, that is to say, the useful radiation from the interference radiation. It may be particularly advantageous to optimize the spatial parameters of the input light beam by, respectively, maximizing and/or minimizing the useful power and/or the non-useful power, respectively. It is possible to use an active (motorized mirrors, or an acousto-optic device, for example) or inactive (mirrors with opto-mechanical mount) control device 9 arranged upstream of the MPLC device. If active alignment devices are used, their parameters are adjusted by means of a feedback loop, at least one of the input parameters of which would be the total or partial measurements of the useful and/or non-useful powers. Such a configuration is shown in FIG. 3, making it possible, via the control device 9, to modify the input beam in order, for example, to seek to reduce the energy of the interference radiation collected at the blocking device 8.

Example 2

In a second example of application, the modal filtering can be combined with a specific shaping of the useful radiation by the transmission device 6 in order to implement a beam splitter device. Such a device produces an output beam consisting of a coherent superposition of single-mode light beams whose amplitude lobes are disjointed in a plane of space. In a particularly advantageous configuration, these single-mode light beams each correspond to copies of a reference light beam, and differ only in their position and possibly their direction of propagation. The reference light beam consists of the target mode, the transverse intensity distribution of which, once the mode has possibly been propagated in free space in a new spatial plane, may be that of a square or circular flat top beam, or a Bessel beam or a Gaussian beam. This processing device 1 according to the present disclosure in which the transmission device 6 comprises a beam splitter therefore implements an optical beam separation function, which is robust with respect to a variation of the spatial parameters of the input beam.

Example 3

A light beam can be used to machine a part with very high precision. It is not always possible to mechanically position the beam in space with this very high precision. The manufacturing tolerances of the elements composing the machining equipment, the drifts and the parasitic movements (vibrations) that the equipment can undergo can introduce shifts in the position occupied by the laser source and therefore affect the shape of the beam that attacks the workpiece.

A processing device 1 according to the present disclosure enables this problem to be solved. The MPLC device 5 of this processing device 1 can be designed by choosing input/output mode bases with separable spatial variables. Such a decomposition is described in "*Fabrication and Characterization of a Mode-selective 45-Mode Spatial Multiplexer based on Multi-Plane Light Conversion,*" Bade et al, *Optical Fiber Communication Conference Postdeadline Papers, OSA Technical Digest, Optical Society of America,* 2018, *paper Th4B.* 3, pp. 1-3 and French patent application FR1851664. These documents demonstrate that such a decomposition allows a reduction in the number of phase masks constituting the MPLC conversion device.

Figure 4:
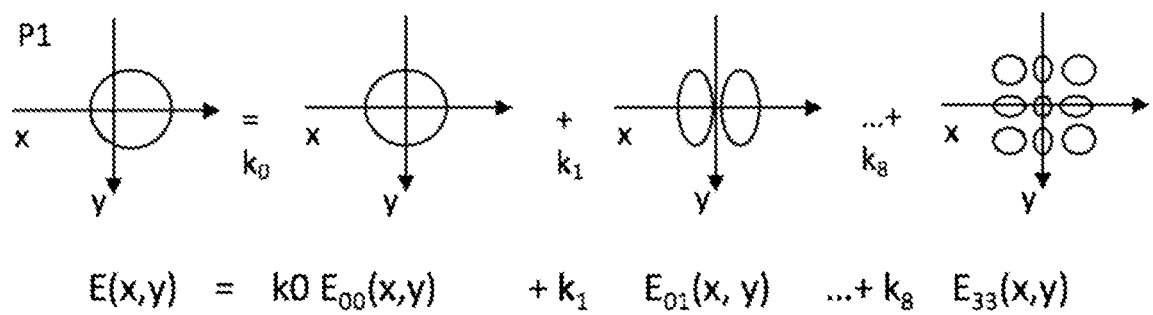
FIG. 4 illustrates an example of modal decomposition of an input beam according to the present disclosure.

In this example, it is considered that the optical source 3 is supposed to emit an input light beam whose shape is Gaussian, centered at point (0, 0) of a Cartesian coordinate system of a first plane P1 transverse to the input beam. As has been specified, the exact position of the input beam in this first plane is liable to be imperfect or to vary over time, with respect to its expected position, centered on the coordinate system of the plane. Whatever the exact position of this beam at a determined instant, and as shown in FIG. 4, the shape E(x, y) of the beam in the first plane P1 can be decomposed modally in the form of a limited development:

$$E(x,y)=k_0E_{00}(x,y)+k_1E_{01}(x,y)+k_2E_{02}(x,y)+k_3E_{10}(x,y)+\\k_4E_{11}(x,y)+k_5E_{12}(x,y)+k_6E_{20}(x,y)+k_7E_{21}(x,y)\\k_8E_{22}(x,y)$$

where $E_{00}$ is a Gaussian mode centered in (0,0), $E_{01}$ to $E_{22}$ the first eight Hermite Gauss modes, $HG_{01}$ to $HG_{22}$ also centered in (0,0), and $k_0$ to $k_8$ the modal decomposition coefficients of the limited development.

Modes $E_{00}$ to $E_{22}$ form the first family of modes with separable variables. They are all spatially superimposed.

Figure 5:
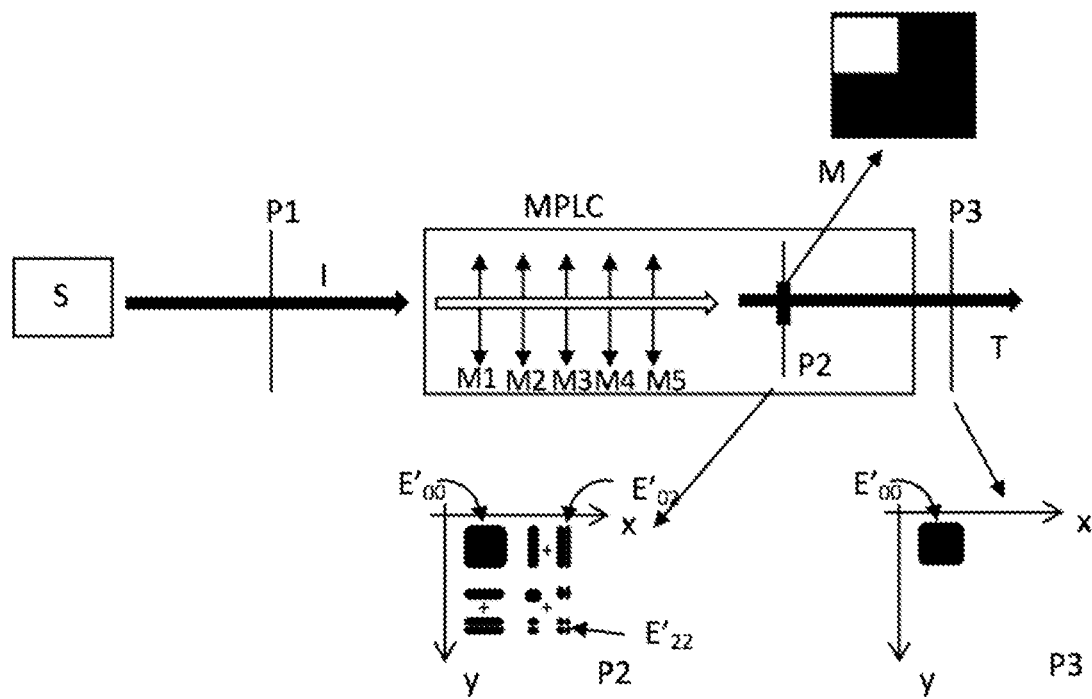
FIG. 5 shows a modal filtering device according to the present disclosure.

A second family of modes is also defined, in a second transverse plane P2 forming the separation plane 7 arranged downstream of the conversion and also provided with a Cartesian coordinate system (x, y). This second family is composed of a "top hat" main mode $E'_{00}$ (x, y), and eight interference modes $E'_{01}$ (x, y) to $E'_{22}$ (x, y). These nine modes are spatially disjointed and arranged in the form of a square in the second plane. They do indeed form a family with separable variables, as shown in FIG. 5.

To solve the posed problem, the MPLC device 5 is configured so that the modal transformation of the input radiation leads to transforming each mode $E_{ij}$ (x, y) of the first plane into the mode $E'_{ij}$ (x, y) of the second plane, that is to say, transforming each mode of the first family into the mode of the same index of the second family. In this way, whatever the exact position of the input light beam, the part corresponding to the first Gaussian mode $E_{00}$ (x, y) is transformed into the "top hat" mode $E'_{00}$ (x, y). The other parts of the input radiation, projecting into the other modes of the first family, are transformed into the other modes of the second family, which are all spatially separated from the first mode $E_{00}$ (x, y). It is thus possible to place a mask M (forming the blocking device 8) at the output of the MPLC conversion device, after the transformation carried out by the phase masks and at the separation plane 7, aimed at blocking the propagation of this part of the transformed radiation, so that only the part corresponding to the first mode $E'_{00}$ (x, y) propagates, as is clearly visible in FIG. 5, in the transverse illustration of a third plane P3 downstream of the mask M.

As has been described previously, the use of a decomposition into separable variables makes it possible to provide a limited number of phase masks of the MPLC conversion device in order to implement the modal transformation, which has just been described. For example, the MPLC can be configured so that it comprises five phase masks, that is to say, five reflections or transmissions of the input radiation imposing a spatial phase shift of the radiation. And a numerical search is conducted for the profiles of each of the phase masks leading to precisely transforming the first family of modes into the mode of the same pair of indices of the second family of modes. This search can be posed as a problem of numerical optimization (a detailed description will be found in the cited state of the art), and the separability of the variables of the first and second families of modes makes it possible to effectively converge this problem toward a solution exhibiting a good degree of optimality, even when the number of phase masks is reduced, five in the chosen example.

As will be readily understood, the present disclosure is not limited to the described embodiment, and it is possible to add variants thereto without departing from the scope of the invention as defined by the claims.

There may, in particular, exist a multitude of transverse planes in which the useful radiation and the interference radiation are spatially separated. In this case, it is possible to place the blocking device 8 in at least one of these planes, or to distribute the optical elements making up the blocking device 8 in a plurality of such planes.

In the case where the input beam consists of femtosecond pulses (from 10 to 900 fs), the processing device 1 becomes particularly relevant because of:

- its compatibility with light beams of wide optical spectra,
- its compatibility with beams whose energies per pulse are significant,
- the robustness it provides with respect to changes in the spatial parameters of the input beam,
- the small number of optical elements that make up the device ensures the stability of the spatial parameters of the produced beams.

The invention claimed is:

1. A device for processing light radiation, comprising:
   an optical input for receiving an input beam from an optical source and for propagating an input radiation in the device, said input radiation being described in a base of input modes, referred to as the input mode base, which input modes are not entirely spatially disjointed;
   an optical output for emitting an output beam;
   a multi-plane light conversion device arranged between the optical input and the optical output and configured to transform the input mode base into an output mode base while ensuring that one particular input mode, referred to as the assumed input mode, is transformed into a particular output mode, referred to as the target mode, the multi-plane light conversion device also being configured to spatially separate, in a separation plane, the input radiation into useful radiation, in the target mode, the useful radiation propagating to the optical output and into an interference radiation; and
   at least one blocking device for blocking the interference radiation, the at least one blocking device arranged in the separation plane so that it does not contribute to the output beam.

2. The device of claim 1, further comprising a transmission device configured to shape the useful radiation and shape the output beam.

3. The device of claim 2, further comprising a plurality of blocking devices arranged, respectively, in a plurality of separation planes in which a part of the interference radiation is spatially isolated.

4. The device of claim 3, wherein the blocking device comprises an absorbing, diffusing or reflecting optical element.

5. The device of claim 4, wherein the blocking device is at least partially integrated into the multi-plane light conversion device.

6. The device of claim 5, wherein the blocking device comprises a detection element for collecting at least part of the interference radiation.

7. The device of claim 6, wherein the transmission device comprises, arranged downstream of the conversion device, a diffractive optical element, a spatial phase modulator, an optical system comprising at least one lens, an axicon, a beam splitter and/or a second multi-plane light conversion device.

8. The device of claim 7, wherein the transmission device is at least partially integrated into the multi-plane light conversion device.

9. The device of claim 7, wherein the transmission device comprises at least one non-spherical and non-plane optical element.

10. The device of claim 9, wherein the non-spherical and non-planar optical element is a reflective optical element.

11. The device of claim 1, wherein the blocking device is at least partially integrated into the multi-plane light conversion device.

12. The device of claim 2, wherein the transmission device comprises, arranged downstream of the multi-plane light conversion device, a diffractive optical element, a spatial phase modulator, an optical system comprising at least one lens, an axicon, a beam splitter and/or a second multi-plane light conversion device.

13. The device of claim 2, wherein the transmission device is at least partially integrated into the multi-plane light conversion device.

14. The device of claim 2, wherein the transmission device comprises at least one non-spherical and non-plane optical element.

15. The device of claim 1, further comprising a control device between the optical input and the multi-plane light conversion device.

16. The device of claim 15, wherein the control device is an inactive optical element.

17. The device of claim 1, wherein the multi-plane light conversion device is configured to transform an input mode base into an output mode base, the input and output mode bases having separable spatial variables.

18. The device of claim 1, further comprising a plurality of blocking devices arranged, respectively, in a plurality of separation planes in which a part of the interference radiation is spatially isolated.

19. The device of claim 1, wherein the blocking device comprises an absorbing, diffusing or reflecting optical element.

20. The device of claim 1, wherein the blocking device comprises a detection element for collecting at least part of the interference radiation.

* * * * *